(12) United States Patent
Tsai

(10) Patent No.: US 7,729,601 B1
(45) Date of Patent: Jun. 1, 2010

(54) SHUTTER FOR AUTOFOCUS

(75) Inventor: Richard Tsai, Arcadia, CA (US)

(73) Assignee: Siimpel Corporation, Arcadia, CA (US)

( * ) Notice: Subject to any disclaimer, the term of this patent is extended or adjusted under 35 U.S.C. 154(b) by 325 days.

(21) Appl. No.: 11/849,049

(22) Filed: Aug. 31, 2007

(51) Int. Cl.
*G03B 17/00* (2006.01)
*G03B 13/00* (2006.01)
(52) U.S. Cl. .......................... 396/77; 396/106
(58) Field of Classification Search .......... 396/73, 396/77, 79, 106
See application file for complete search history.

(56) References Cited

U.S. PATENT DOCUMENTS 7,071,986 B2 * 7/2006 Kobayashi et al. .......... 348/353
2008/0062529 A1 * 3/2008 Helwegen et al. ........... 359/665
2008/0095523 A1 * 4/2008 Schilling-Benz et al. ..... 396/111

* cited by examiner

*Primary Examiner*—Rodney E Fuller
(74) *Attorney, Agent, or Firm*—Haynes and Boone, LLP

(57) ABSTRACT

An autofocus method can include moving a lens and reading out first image data associated with a plurality of image pixels during a first low light interval, modifying camera parameters to provide autofocus image light received during an autofocus light interval, acquiring second image data associated with the plurality of image pixels during the autofocus light interval, modifying camera parameters to substantially reduce image light received during a second low light interval, reading out the second image data during the second low light interval, and analyzing at least the first image data and the second image data to determine a focus position of the lens.

5 Claims, 2 Drawing Sheets

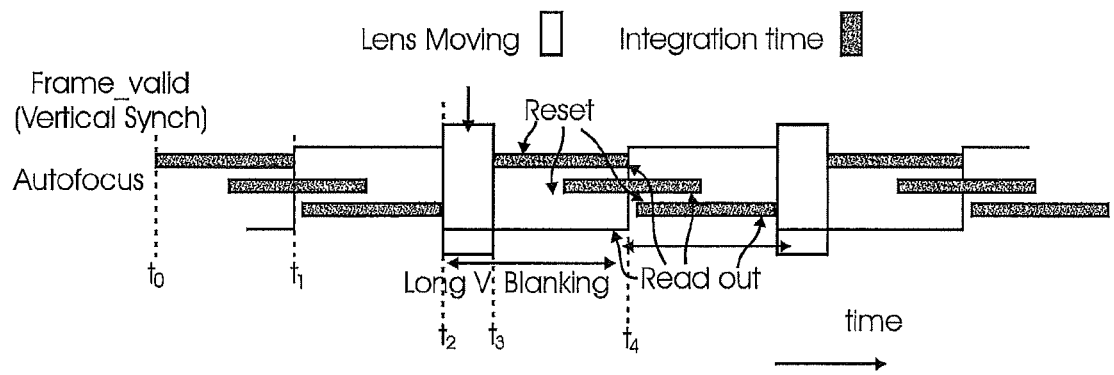
FIG. 1 - Prior Art
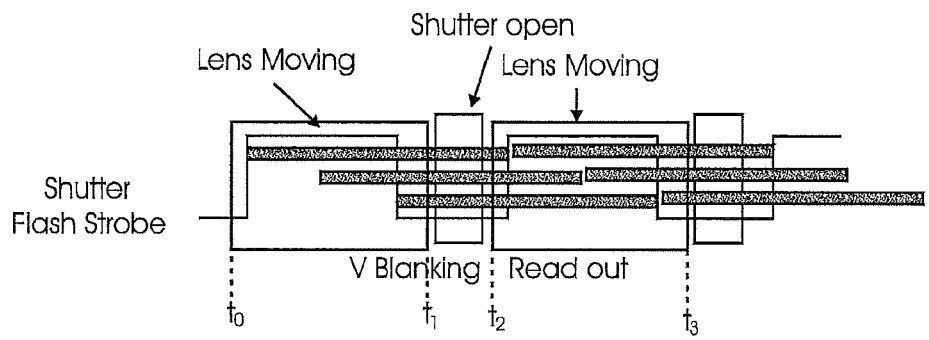
FIG. 2
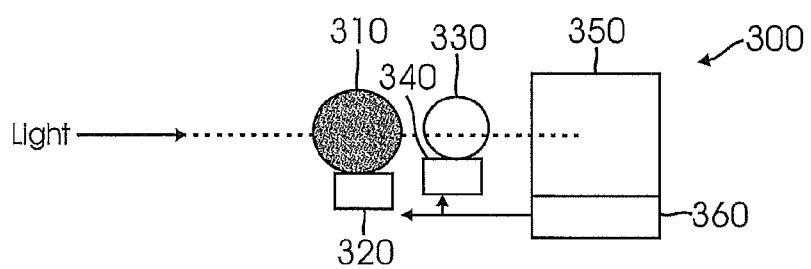
FIG. 3

SHUTTER FOR AUTOFOCUS

TECHNICAL FIELD

This invention generally relates to miniature cameras.

BACKGROUND

Miniature cameras are currently available with many electronic devices, such as cellular telephones, laptop computers, personal digital assistants (PDAs), and the like. Miniature cameras are also available as stand-alone devices for applications such as security and surveillance.

The market for miniature cameras is rapidly expanding. For example, camera-equipped cell phones were unheard of just a few years ago; now, they are a significant portion of the cell phone market. However, available miniature cameras may not be optimal for some applications.

Many miniature cameras are fixed focus cameras. In a fixed focused camera, a relatively small aperture is used. As a result, the depth of field is sufficient to provide acceptable focus over a wide range of distances. However, the provided focus may be unacceptable for some applications. Additionally, the relatively small aperture limits the light used to form the image. This limitation may severely limit the camera's use in low light conditions.

SUMMARY

An autofocus method is disclosed. According to an example of an embodiment, the method can comprise moving a lens and reading out first image data associated with a plurality of image pixels during a first low light interval, modifying one or more camera parameters to provide autofocus image light received at a detection system during an autofocus light interval, acquiring second image data associated with the plurality of image pixels during the autofocus light interval modifying at least one of the one or more camera parameters to substantially reduce image light received at the detection system during a second low light interval, reading out the second image data during the second low light interval, and analyzing at least the first image data and the second image data to determine a focus position of the lens.

According to an example of an embodiment, the method can comprise performing autofocus and performing image acquisition. At least one camera parameter is different during autofocus and image acquisition.

These and other features and advantages of the present invention will be more readily apparent from the detailed description of the exemplary implementations set forth below taken in conjunction with the accompanying drawings.

BRIEF DESCRIPTION OF THE DRAWINGS

FIG. 1 is a timing diagram for an existing autofocus system;

FIG. 2 is a timing diagram for an autofocus system, according to some embodiments;

FIG. 3 is a schematic diagram of a camera system, according to some embodiments.

Like reference symbols in the various drawings indicate like elements.

DETAILED DESCRIPTION

Figure 4:
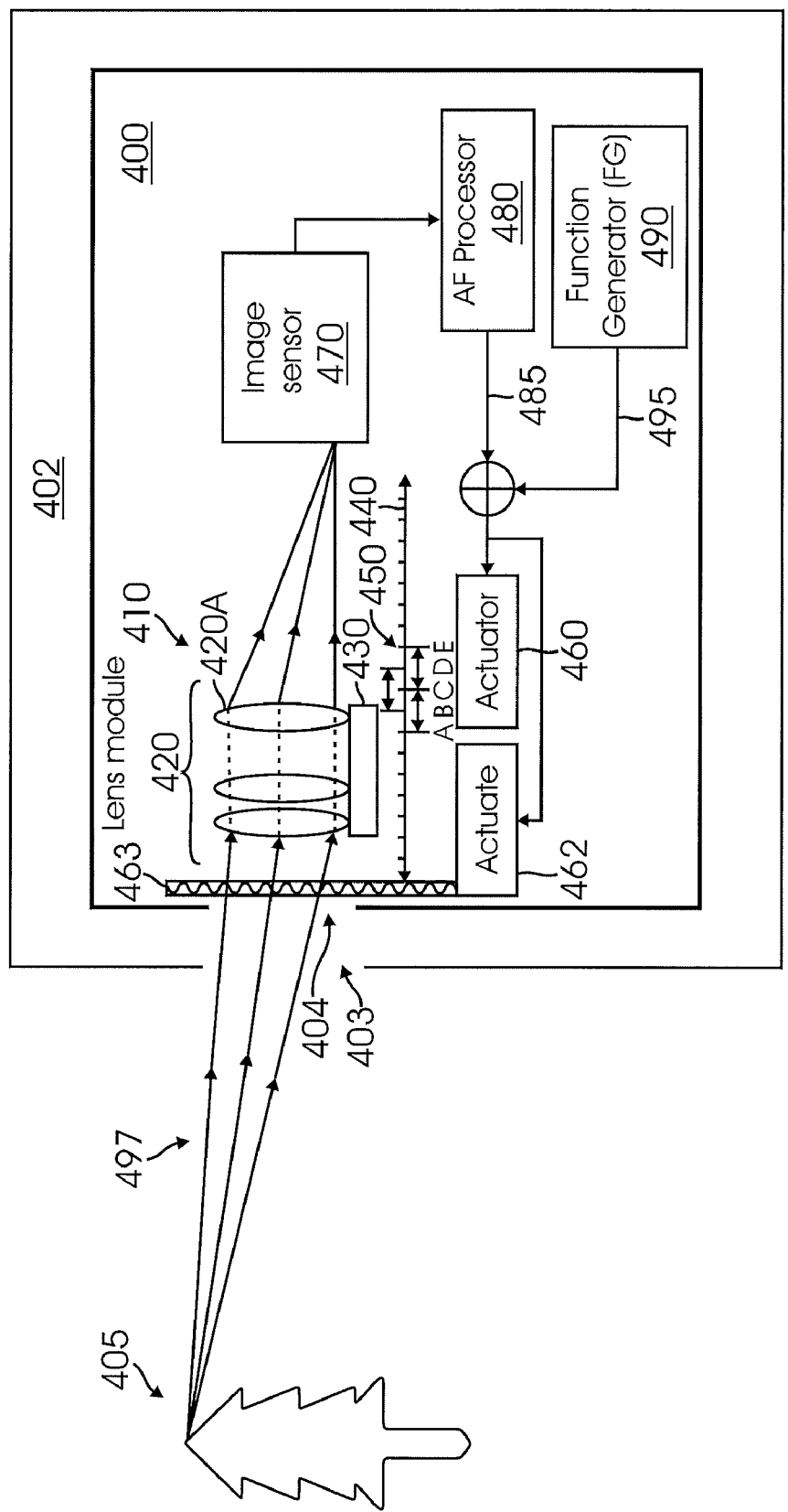
FIG. 4 is a schematic diagram of a camera system and subject, according to some embodiments.

In some existing digital camera systems, an autofocus (AF) system implements a contrast AF process. In the contrast AF process, the lens is moved to various incremental positions at different distances from an image sensor, and the best focus position is determined based on image data acquired at different lens positions. The image sensor captures an image at each incremental position while the lens is momentarily stationary. A sharpness filter may be applied to each image to provide an associated sharpness score for each image. The lens position associated with the highest sharpness score may then be used for capturing in-focus images.

However, existing AF processes may not be optimal. For example, when the camera, lens, and/or subject moves, the acquired image may be blurred. This can be a particular problem with cameras using CMOS imaging sensors.

In a CMOS imaging sensor, an electronic rolling shutter (ERS) is used. With an ERS, image data for each row in the image is read out in sequence, so that image data for different rows is obtained at different times. When the lens, camera, and/or image subject(s) move during the exposure time, the image is blurred, making the AF analysis inaccurate.

FIG. 1 shows timing diagram for an example of an existing AF process for a camera implementing ERS. The detector may include a CMOS imaging sensor with an array (rows and columns) of image pixels. At $t_0$, acquisition of image data is initiated in response to a Vertical Synch signal or Frame_valid signal. At $t_1$, sequential readout of the pixels of each of the rows of the detector is initiated. Although only three rows are shown in FIG. 1, a detector generally includes many rows. As FIG. 1 illustrates, although the integration time for each row is the same, the exposure for different rows starts and ends at a different time. Thus, movement may introduce blur into the acquired image data.

At $t_2$, the readout of all rows is complete, and lens movement is initiated. At $t_3$, the lens is in its next position, and image data acquisition is sequentially initiated in each of the rows in response to an ERS reset signal in a manner like that at $t_0$. At $t_4$, readout of the rows is initiated in response to read out signals in a manner like that at $t_1$.

Another problem with some current techniques is that the vertical blanking time can be significant, which leads to a lower frame rate. Referring again to FIG. 1, the vertical blanking time $t_4-t_2$ includes the time for lens movement, as well as the integration time for data acquisition. Relatively long vertical blanking time can be a problem not only for systems incorporating ERS, but also systems using global electronic shuttering or global physical shuttering. With global physical shuttering, a physical shutter may be used to alternately block and transmit light, so that the image light for all pixels is received during the same time period. Similarly, with global electronic shuttering, an analog memory may be used for each pixel so that the image light for all pixels is received during the same time period.

The vertical blanking time is limited by the time needed to move the lens from one position to another and to settle at the new position. In order to move the lens quickly from position to position, an actuator rapidly accelerates the lens from the starting position toward the target position, then rapidly decelerates once the lens is near the target position. This may induce some oscillation about the target position. In order to avoid blurring due to this oscillation, the lens needs to be given time to settle prior to obtaining image date for the AF determination.

The systems and techniques herein may provide a number of advantages over existing systems. First, the vertical blanking time and data acquisition time may be significantly reduced. Second, the acquired data for all of the image pixels corresponds to the same time interval, even if ERS is used.

FIG. 2 shows a timing diagram for an autofocus system, according to some embodiments. FIG. 3 shows a schematic diagram of a camera system 300 that may be used to implement AF according to the timing diagram of FIG. 2. Camera system 300 includes a physical shutter 310 positioned on an actuator 320. System 300 further includes a lens 330 positioned on an actuator 340. Light transmitted into the camera through shutter 310 and lens 330 is incident on a detection system 350 including an imaging sensor such as a CCD or CMOS imaging sensor. System 300 includes a controller 360. In the illustrated embodiment, controller 360 receives image information from detection system 350, and performs AF analysis to determine a best focus position based on image information corresponding to a plurality of positions of lens 330. Controller 360 also controls actuators 320 and 340. Of course, many embodiments are possible. The functions of controller 360 may be performed by one or more modules in addition to the illustrated module, and controller 360 may be integrated in system 300 in a number of ways.

At time $t_0$, a low light interval is initiated. This may be accomplished in a number of ways. In system 300, shutter 310 may be positioned in front of the camera aperture to substantially block light from lens 330 and detection system 350. In another example, the camera may include a light source such as a flash strobe with "on" and "off" states. The low light interval may be initiated by switching from the on state to the off state. In some embodiments, the low light interval may be initiated using electronic shuttering.

During some or all of the low light interval, lens 330 may be moved from a first position to a second different position in response to receiving a control signal from controller 360 at actuator 340. In the embodiment illustrated in FIG. 2, lens 330 reaches the second position prior to the end of the low light interval, so that any oscillation of the lens that occurs does not affect the light acquired for the autofocus operation. The low light interval ends at $t_1$.

At time $t_1$, an auto-focus light interval is initiated. During the AF light interval, imaging information is acquired for all pixels. That is, all pixels are exposed at the same time, and for the same length of time. At time $t_2$, a second low light interval is initiated, and lens 330 is moved to a different position. After lens 330 is in its new position, a second AF interval is initiated at time $t_3$. Once image information has been acquired for two or more positions of lens 330, the image information may be used to determine the best focus position of lens 330. AF processing instructions may be stored in a memory in, for example, controller 360 and may be executed by a processor included in controller 360.

Using the systems and techniques of FIGS. 2 and 3, the frame rate may be increased, but blurring due to movement of lens 330, camera system 300, and/or object(s) in the camera view may be substantially decreased.

As FIG. 2 illustrates, embodiments of the invention allow for shorter integration times to be used. This advantage stems from the ability to use different camera parameter settings during AF and during acquisition of image information for video or still images (referred to collectively herein as "image acquisition"). For example, during image acquisition, image information obtained at the imaging sensor included in detection system 300 may be digitally amplified with an imaging gain $G_I$ to obtain a particular signal to noise ratio. $G_I$ generally depends on parameters such as the light level, exposure length, and the like. However, since the image information used for AF need not be the same image information used in image acquisition, the gain can be increased to a larger value $G_{AF}$ during the AF process. Although the noise may increase due to larger gain, an accurate sharpness determination may be still be obtained. In another example, a flash may be used to increase the luminance at the detector during the AF process, even when a flash would not provide the optimum image date during image acquisition.

In some embodiments, the movement of lens 330 may be effectively hidden from the user. That is, although image information for AF may be obtained at a number of positions, the positioning may not be reflected in a display to a user.

FIG. 4 illustrates a block diagram of a camera 400 with an adjustable focus in accordance with an embodiment of the invention. Camera 400 may be implemented, for example, as a digital still camera or a digital video camera.

In certain embodiments, camera 400 may be implemented as a miniature camera that is part of a personal electronic device 402 such as a portable computer, a laptop computer, a notebook computer, a pocket personal computer (pocket PC), a personal digital assistant (PDA), a mobile telephone, a mobile security system, a fixed security system, or other device. Device 402 and camera 400 include apertures 403 and 404, respectively, which may receive light 497 reflected from an external object 405.

As shown, camera 400 includes a lens module 410, an actuator 460, an image sensor 470, an automatic focus (AF) processor 480, and a function generator 490. Lens module 410 may include a plurality of lenses 420 secured relative to a stage 430. Lens module 410 may further include a lens barrel (not shown) for holding lenses 420 and a lens mount (not shown) for securing lenses 410 and/or the lens barrel to stage 430. In one embodiment, one or more of lenses 420 may have a diameter in the range of about 10 microns to about 20 microns.

Actuator 460 may be in electrical, mechanical, and/or electro-magnetic communication (not shown) with stage 430 for controlling the position of stage 430. In this regard, actuator 460 may be implemented in accordance with any appropriate mechanism for providing controlled movements on a scale appropriate for personal electronic device 402. For example, in various embodiments, actuator 460 may be implemented as a Lorentz motor, a micro-electro-mechanical systems (MEMS) device, or other appropriate apparatus.

Stage 430 may be translated toward or away from image sensor 470 by actuator 460 along an axis 440. In this regard, a desired one of lenses 420 may be selectively positioned at any of a plurality of positions 450 along axis 440 by translating stage 430 (and thereby translating lenses 420) to a desired one of positions 450. For example, in the embodiment illustrated in FIG. 4, a center of a lens 420A is aligned with position 450B along axis 440. In one embodiment, positions 450 may be spaced approximately 20 microns apart.

Image sensor 470 may be configured to capture digital images of object 405 from light 497 passing through lenses 420. Image sensor 470 may be implemented using any appropriate technology for capturing digital images such as, for example, a charge-coupled device (CCD) or complimentary metal-oxide semiconductor (CMOS) device. Images of object 480 captured by image sensor 470 can be provided to AF processor 460.

AF processor 480 may be configured with appropriate hardware and/or software to perform various operations as further described herein. AF processor 480 may provide control signals 485 to actuator 460 for controlling the movement of stage 430 and lenses 420. Function generator 490 may be configured with appropriate hardware and/or software to provide control signals 495 to actuator 460 which may be combined with control signals 485 as illustrated in FIG. 4. AF processor 480 may also provide control signals to an actuator 462 to move a shutter 463 to alternately block and transmit light 497.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the word "means" are intended to be interpreted under 35 USC 112, sixth paragraph. In the claims, the word "a" or "an" embraces configurations with one or more element, while the phrase "a single" embraces configurations with only one element, notwithstanding the use of phrases such as "at least one of" elsewhere in the claims. Moreover, no limitations from the specification are intended to be read into any claims, unless those limitations are expressly included in the claims. Accordingly, other embodiments are within the scope of the following claims.

What is claimed is:

1. An autofocus method comprising:
    moving a lens and reading out first image data associated with a plurality of image pixels during a first low light interval;
    modifying one or more camera parameters to provide autofocus image light received at a detection system during an autofocus light interval;
    acquiring second image data associated with the plurality of image pixels during the autofocus light interval;
    modifying at least one of the one or more camera parameters to substantially reduce image light received at the detection system during a second low light interval;
    reading out the second image data during the second low light interval; and,
    analyzing at least the first image data and the second image data to determine a focus position of the lens.

2. The method of claim 1, wherein the modifying the one or more camera parameters comprises changing a position of a physical shutter to allow image light into an aperture.

3. The method of claim 2, wherein the modifying the at least one of the one or more camera parameters comprises changing the position of the physical shutter to substantially block image light from the aperture.

4. The method of claim 1, wherein the camera includes a light source having an off state and an on state, and wherein modifying the one or more camera parameters comprises initiating the on state of the light source.

5. The method of claim 1, wherein the camera is configured to implement electronic shuttering having an open state and a closed state, and wherein modifying the one or more camera parameters comprises initiating the open state of the electronic shutter.

* * * * *